US012598118B1

(12) United States Patent
Pettrey et al.

(10) Patent No.: US 12,598,118 B1
(45) Date of Patent: *Apr. 7, 2026

(54) MODIFYING TRANSMISSIONS BASED ON ORDERED ARRANGEMENTS OF SEGMENTS OF USERS

(71) Applicant: Chalice Custom Algorithms, Inc., Brooklyn, NY (US)

(72) Inventors: Tylynn Pettrey, Tampa, FL (US); Robert Mooney, Brooklyn, NY (US); Adam Heimlich, New York, NY (US); Joseph Wilson, Atlanta, GA (US)

(73) Assignee: Chalice Custom Algorithms, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/341,328

(22) Filed: Sep. 26, 2025

Related U.S. Application Data

(63) Continuation of application No. 19/248,765, filed on Jun. 25, 2025.

(51) Int. Cl.
H04L 41/5067 (2022.01)
(52) U.S. Cl.
CPC ................................ H04L 41/5067 (2013.01)
(58) Field of Classification Search
None
See application file for complete search history.

(56) References Cited

U.S. PATENT DOCUMENTS

| | | | | |
|---|---|---|---|---|
| 8,635,226 B2 * | 1/2014 | Chang | ............... | G06Q 30/0204 |
| | | | | 707/740 |
| 11,061,910 B1 * | 7/2021 | Kondiles | ........... | G06F 16/24568 |
| 2012/0226697 A1 * | 9/2012 | Chang | .................... | G06F 16/40 |
| | | | | 707/E17.089 |
| 2021/0019664 A1 * | 1/2021 | Zhou | ...................... | G06F 16/35 |
| 2021/0240713 A1 * | 8/2021 | Kondiles | .......... | G06F 16/24568 |
| 2021/0240716 A1 * | 8/2021 | Kondiles | .......... | G06F 16/24568 |
| 2021/0240717 A1 * | 8/2021 | Kondiles | ............. | G06F 16/2456 |
| 2021/0240718 A1 * | 8/2021 | Kondiles | ............. | G06F 16/2456 |

* cited by examiner

*Primary Examiner* — Ranodhi Serrao
(74) *Attorney, Agent, or Firm* — Perkins Coie LLP

(57) ABSTRACT

A transmission platform can modify transmissions of outputs based on the impact of the outputs on various segments of users. The transmission platform can initiate a transmission of outputs to a non-control group of users and receive results generated by both the non-control group of users and a control group of users who did not receive the output. The transmission platform can determine segments of users based on certain characteristics and can compare the results, within each segment, from the control and non-control groups. The transmission platform can identify certain segments for which the difference in results is statistically significant, indicating that the output caused a positive impact for those segments. The transmission platform can modify the transmission to target these segments with future outputs and can prioritize those segments demonstrating the greatest impact (e.g., the greatest difference between the control and non-control groups).

20 Claims, 9 Drawing Sheets

Impact by Age

| | 18-24 | 25-34 | 35-44 | 45-54 | 55-64 | 65+ |
|---|---|---|---|---|---|---|
| % | -0.40% | 5.90% | 6.30% | 6.50% | -7.60% | 9.50% |

Statistically Significant
□ False
■ True

420

Impact by Question/KPI 4.80%

1.20%

4.60%

-0.60%

0.70%

Product
Favorability

Product
Consideration

Product
Awareness

Message
Association

Recall

%

Statistically Significant

☐ False   ■ True

MODIFYING TRANSMISSIONS BASED ON ORDERED ARRANGEMENTS OF SEGMENTS OF USERS

CROSS-REFERENCE TO RELATED APPLICATIONS

This application is a continuation of U.S. application Ser. No. 19/248,765, titled "MODIFYING TRANSMISSIONS BASED ON ORDERED ARRANGEMENTS OF SEG-MENTS OF USERS," filed Jun. 25, 2025, which is hereby incorporated by reference in its entirety.

BACKGROUND

Segments can include groups of users categorized based on specific criteria such as demographics, interests, or behaviors. Transmissions of various information, features, or content can be output to various segments of users.

Figure 1:
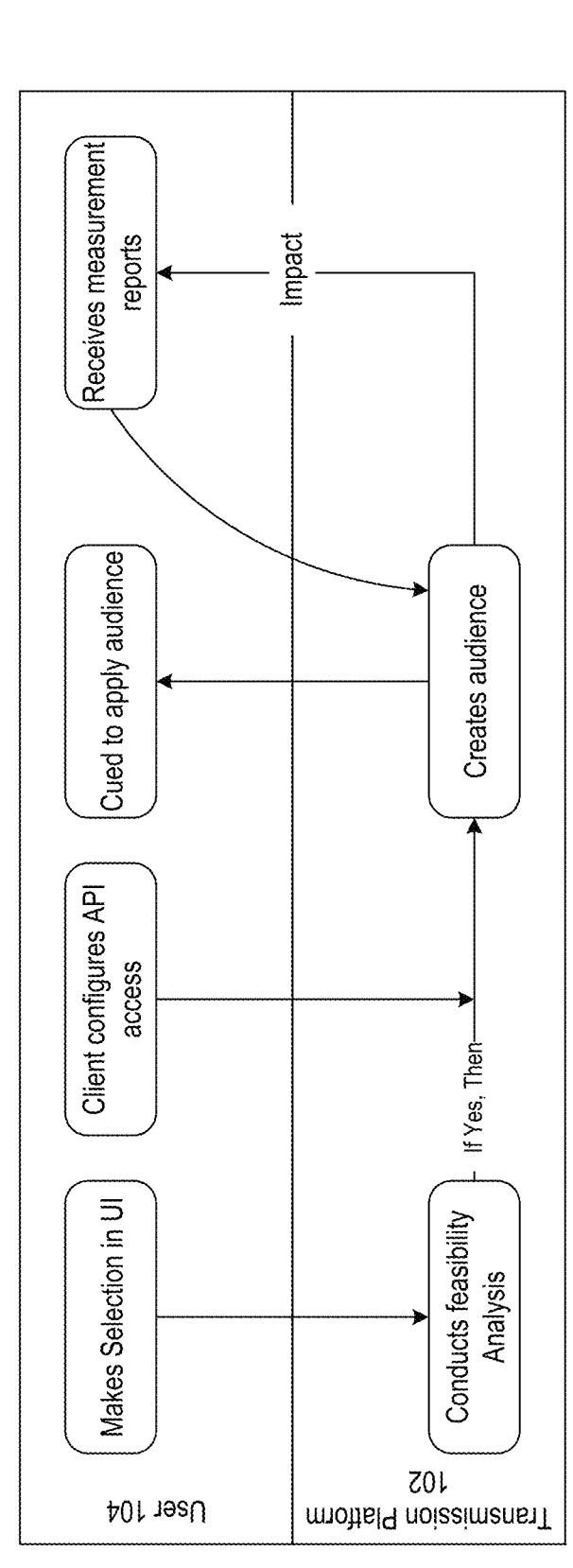
FIG. 1 shows an example computing environment that includes a transmission platform in accordance with some implementations of the present technology.

The drawings have not necessarily been drawn to scale. For example, some components and/or operations are sepa-rated into different blocks or combined into a single block for the purposes of discussion of some of the implementa-tions of the disclosed system. Moreover, while the technol-ogy is amenable to various modifications and alternative forms, specific implementations have been shown by way of example in the drawings and are described in detail below. The intention, however, is not to limit the technology to the particular implementations described. On the contrary, the technology is intended to cover all modifications, equiva-lents, and alternatives falling within the scope of the tech-nology as defined by the appended claims.

DETAILED DESCRIPTION

Software feature adoption in a dynamic user environment presents significant challenges, particularly when relying on traditional A/B testing methods to analyze results and imple-ment changes. A/B testing involves dividing users into two groups within each segment: one group with access to the new feature and a control group without access. By com-paring usage metrics between these groups, the platform can determine the feature's impact. However, this retrospective approach means that any insights gained and subsequent changes are applied after the test period has concluded. This delay can result in prolonged periods where suboptimal features remain in use, potentially affecting user engage-ment.

The reliance on post-test analysis adds another layer of complexity to the process. User engagement data, feature usage metrics, and satisfaction levels must be collected and analyzed after the test period, which can be time-consuming. This delay in analysis means that the platform can miss opportunities to make timely adjustments that could enhance user experience. Additionally, the integration and normal-ization of diverse data sources can further complicate the process, as the platform must ensure that all relevant data is accurately captured and analyzed. Furthermore, the inability to make real-time adjustments based on current user behav-ior and engagement metrics can hinder the platform's ability to respond swiftly to evolving technological conditions.

Another significant drawback is the static nature of user behavior and engagement analysis during the test period. User preferences and interactions with new software fea-tures can change rapidly, but traditional A/B testing does not allow for real-time adaptation. This means that any changes to the feature deployment strategy are only made after the test results are analyzed, potentially leading to missed opportunities for optimization. The platform must wait until the end of the test period to make any adjustments, which can result in a lag in addressing user needs and preferences. This reactive approach can be insufficient for maintaining user engagement and satisfaction in a fast-paced digital environment. Overcoming these challenges requires a shift towards more proactive and adaptive testing methods that can provide real-time insights and enable timely decision-making, ensuring that software development resources are allocated efficiently and that user outcomes are optimized.

This patent document discloses techniques that can be implemented to overcome the aforementioned technical challenges in the context of software testing. As an illustra-tive example, the transmission platform is able to perform A/B testing with real-time feedback from different user groups, enhancing the ability to make timely and informed decisions. By leveraging advanced data analytics and tools, the transmission platform can continuously monitor user interactions and engagement metrics as the testing pro-gresses. This real-time feedback allows the platform to dynamically assess the performance of new features and identify statistically significant differences between the test and control groups across different segments. When a posi-tive impact is detected, the platform can promptly roll out the successful features more widely to the relevant user segments, particularly targeting users who have not yet been exposed to the new feature. This proactive approach ensures that beneficial changes are implemented timely, optimizing user experience and engagement while minimizing the period during which suboptimal features remain in use. By enabling real-time adjustments based on real-time data, the disclosed techniques facilitate a more agile and responsive feature deployment strategy, ultimately leading to more efficient resource allocation and improved user satisfaction.

Technical challenges arise in the context of communica-tion and outreach efforts, as well. Conventional methods of measuring the effectiveness of communication and outreach transmissions similarly involve retrospective analyses and modifications to future transmissions. The technological drawbacks of current methods are significant. These methods involve dividing users into groups, with one group exposed to a particular transmission and a control group without exposure. By comparing engagement metrics between these groups, the platform can determine the transmission's impact. However, this retrospective approach means that any insights gained and subsequent changes are applied only after the analysis period has concluded. This delay can result in prolonged periods during which effective transmissions are underutilized, potentially affecting user engagement and the overall effectiveness of the outreach efforts. This delay also means that the platform can miss opportunities to make timely adjustments that could enhance user experience and the effectiveness of the communications. Furthermore, the inability to make real-time adjustments based on current user behavior and engagement metrics can hinder the platform's ability to respond swiftly to evolving trends and issues, ultimately impacting the success of the outreach efforts.

The disclosed techniques can be implemented to overcome these technical challenges as well. As an illustrative example, the transmission platform is able to initiate a transmission to a first group of users and receive engagement metrics from both the first group and a control group that did not receive the transmission. The platform can determine segments of the groups of users and compare the metrics for each segment between the two groups. The transmission platform can thus identify segments for which the transmission had a statistically significant impact on the users. The transmission platform can rank the segments based on magnitude of impact resulting from the transmission. Using this ranking, the transmission platform can modify the transmission to target the segments showing the greatest impact of the transmission. The transmission platform can perform these steps at various cadences and or in response to different triggers. For example, the transmission platform can assess the impacts of transmission on a daily basis and modify the transmission whenever statistically significant results are identified. By doing so, the transmission platform is able to adapt transmissions to dynamic conditions and optimize the effectiveness of transmission outputs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Example Implementations of a Transmission Platform

Measuring the impact of an output on various metrics is important for understanding the effectiveness of any output strategy. By evaluating key metrics, the transmission platform can gain valuable insights into how well the transmission is performing with target audiences. The disclosed techniques of assessing these metrics during a transmission, such as a feature rollout or a communication campaign, can provide real-time feedback that allows for timely adjustments and optimizations. This iterative approach can lead to significant improvements in the campaign's overall performance, ensuring that resources are allocated efficiently and objectives are met more effectively. By continuously monitoring and refining their strategies, the transmission platform can maximize the benefits to be gained from the transmission.

In some implementations, a transmission of a number of outputs (e.g., communications, software updates, or other outputs) is initiated. In some implementations, the outputs are sent to a first plurality of users. In some implementations, the plurality of outputs relates to a source of the outputs. For example, the outputs can relate or refer to a company from which the outputs originate. In some implementations, the outputs can relate or refer to a third party. As an illustrative example, in the realm of communications, a company can send targeted messages to a non-control group to evaluate the effectiveness of its outreach efforts. This process can involve delivering specific communications to a selected group of users while another group, the control group, receives no such messages or different ones. In the realm of A/B testing, a software company can transmit software updates to the non-control group to evaluate the effectiveness of new features or improvements. This process can involve sending the updates to a selected group of users while another group, the control group, continues to use the existing version of the software. By comparing the performance and user feedback from both groups, the company can determine the impact of the updates and make informed decisions about future software development.

FIG. 1 shows an example computing environment 100 that includes a transmission platform in accordance with some implementations of the present technology. FIG. 1 includes a transmission platform 102, which can facilitate or perform dynamic modifications to transmissions based on real-time impact. A user 104 can interact with the transmission platform 102 to initiate or request dynamic modifications to transmissions based on real-time impact. For example, the user 104 can make selections in a user interface (UI), such as selections to identify or create a survey that assesses the impact of transmissions. The transmission platform 102 can receive the selections via the UI and can conduct a feasibility analysis. In some implementations, the feasibility analysis can include assessing whether a relevant transmission has been output to enough users for the transmission platform to assess its impact to a statistically significant extent. If the transmission platform 102 determines that the relevant transmission has not been output to enough users for the transmission platform to assess its impact to a statistically significant extent, the process can pause until the relevant transmission has been output to additional users. If the transmission platform 102 determines that the relevant transmission has been output to enough users for the transmission platform to assess its impact to a statistically significant extent, the process can continue.

The user 104 can be responsible for configuring API access to facilitate access to the survey that assesses the impact of transmissions. The transmission platform 102 can create an audience, which can include the users who will receive the outputs (e.g., the non-control group). In some implementations, the transmission platform 102 transmits, to the user 104, a listing of the users in the audience. The user 104 can be responsible for applying the outputs to the audience. For example, the user 104 can transmit the outputs to the audience via a user platform or via various channels.

Figure 2:
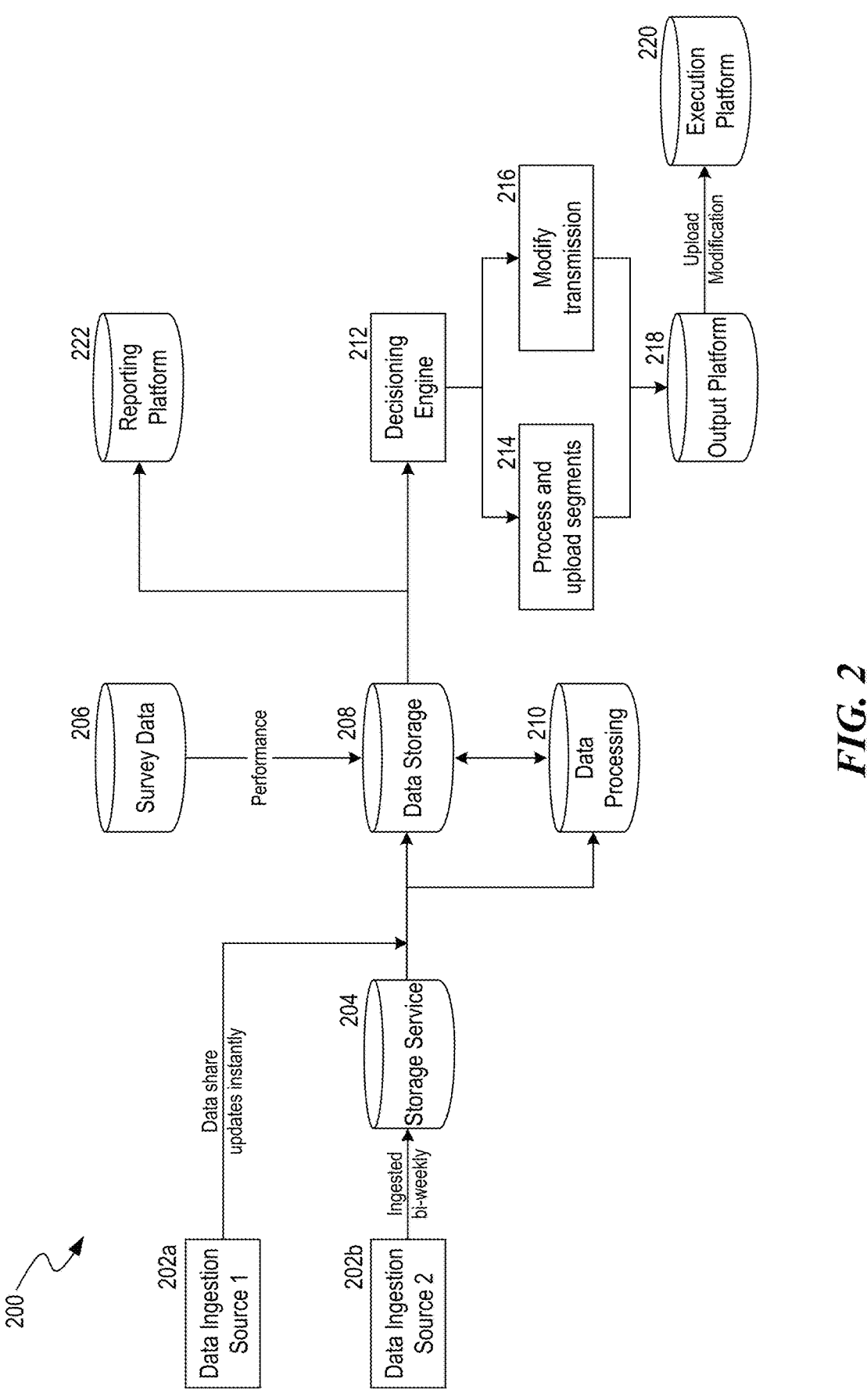
FIG. 2 shows an example workflow for the transmission platform in accordance with some implementations of the present technology.

FIG. 2 shows an example workflow 200 for the transmission platform in accordance with some implementations of the present technology. At 202a-202b, the transmission platform ingests data from various sources. One source can deliver data via a cloud storage service, while another source can use a data warehousing service. Mapping algorithms are applied to match the ingested data with unique identifiers. The data can relate to the users in control and non-control groups. This data can be loaded biweekly with accuracy thresholds. In some implementations, data from certain sources is stored using a storage service at 204. The type of data that can be utilized includes demographics about users, such as age, gender, location, and user preferences. For example, in a communications context, the transmission platform can utilize demographic data to assess the impact of outputs on specific user segments. In a software context, user data such as subscription status and usage patterns can be utilized.

The transmission platform can receive a first plurality of results generated by the first plurality of users (e.g., the non-control group) and a second plurality of results generated by a second plurality of users (e.g., the control group). In some implementations, the first plurality of results and the second plurality of results relate to the source. For example, the results can include responses to surveys, questions, polls, or other prompts, which request opinions, impressions, or other feedback relating to the source of the outputs. In the realm of assessing the impact of communications, a company can analyze the feedback from users who received targeted messages compared to those who did not. This analysis can help the company understand the effectiveness of its communications strategy and make necessary adjustments. In some implementations, the feedback can request the users' opinions of a company from which the messages originated or a company to which the messages otherwise relate. Similarly, in the context of A/B testing, the company can compare the feedback from users who received a new software update (e.g., the non-control group) with those who continued using the existing version (e.g., the control group). By evaluating the differences in user satisfaction and performance metrics, the company can determine the success of the new update.

As shown in FIG. 1, the user 104 can receive measurement reports (e.g., survey), for example, via a platform or API that is configured to receive these reports. The measurement reports can include the results previously discussed. In some implementations, the measurement reports are fed back into the transmission platform 102. The transmission platform can use the reports to perform assessments of impact and to modify transmissions accordingly. As shown in FIG. 2, the transmission platform receives survey data at 206. The survey data can demonstrate performance of outputs by including survey responses from both control and non-control groups with respect to the outputs. Survey data functionality delivers daily responses from exposed and control groups for survey questions. This data can be ingested via API and stored in a data storage, for example, at 208. The data is then processed at 210.

In some implementations, the transmission platform performs certain steps discussed herein iteratively. Performing different steps of the process at certain cadences or based on specific triggers can significantly enhance the effectiveness of a marketing campaign. For example, the transmission platform can receive survey results at a certain frequency (e.g., on an hourly or daily cadence), allowing for continuous monitoring of feedback and performance. This real-time data collection can enable the transmission platform to swiftly identify trends and patterns in responses. For example, if survey results indicate a statistically significant increase in brand awareness among a particular demographic segment, the transmission can be promptly modified to further target and engage this group. Conversely, if statistically significant negative feedback is detected for a segment, adjustments can be made to refrain from transmitting the output to that particular segment. By leveraging these dynamic and responsive techniques, the transmission platform can ensure that the transmission is maximally relevant and impactful, ultimately leading to better outcomes and a more efficient use of resources.

In some implementations, the transmission platform can determine segments of users according to one or more characteristics. In particular, the transmission platform can determine a plurality of segments of the first plurality of users (e.g., the non-control group) and the second plurality of users (e.g., the control group). Each segment can include a first subset of the first plurality of users and a second subset of the second plurality of users. For example, a segment can be determined based on a single characteristic, such as age (e.g., 25-34) or role (e.g., software developer). The segment can include a first subset of the non-control group users who are ages 25-34 and a second subset of the control group users who are ages 25-34. In some implementations, a segment can be determined based on multiple characteristics, such as age (e.g., 25-34) and sex (e.g., female). The segment can include a first subset of the non-control group users who are ages 25-34 and female and a second subset of the control group users who are ages 25-34 and female. In some implementations, any number of characteristics can be used to determine a segment of the users.

The transmission platform can compare, for each segment of the plurality of segments, a first subset of results of the first plurality of results to a second subset of results of the second plurality of results. For example, the first subset of results is generated by a corresponding first subset of the first plurality of users (e.g., non-control group) and the second subset of results is generated by a corresponding second subset of the second plurality of users (e.g., control group). In some implementations, the transmission platform compares, for each segment, the impact of the transmission on the non-control group to the impact on the control group. As an example, the transmission platform can compare survey results received from the first subset of the non-control group users who are ages 25-34 and female to survey results received from a second subset of the control group users who are ages 25-34 and female. The transmission platform can, for example, compare results received in conjunction with a first subset of the non-control group users who are software developers to results received in conjunction with a second subset of the control group users who are software developers.

In some implementations, the transmission platform compares the results with the goal of assessing the impact of the output on various metrics, such as an impact on awareness of the source of the output. For example, impact can be a measure of the effectiveness of an advertising campaign in enhancing a brand's perception and recognition among its audience. This impact can be assessed through various metrics, such as increased brand awareness, improved brand recall, and a more favorable brand image. For example, an impact on awareness can be observed when a company launches a new advertising campaign and subsequently sees a rise in the number of people who recognize and remember the brand. Additionally, launching a new feature or software update can significantly impact awareness. For example, if a tech company releases a major update to its popular app, incorporating innovative features that enhance user experience, this can generate a substantial increase in brand awareness. This heightened awareness can lead to more people becoming aware of the brand and its offerings, ultimately contributing to a stronger market presence and increased customer interest.

Figure 3:
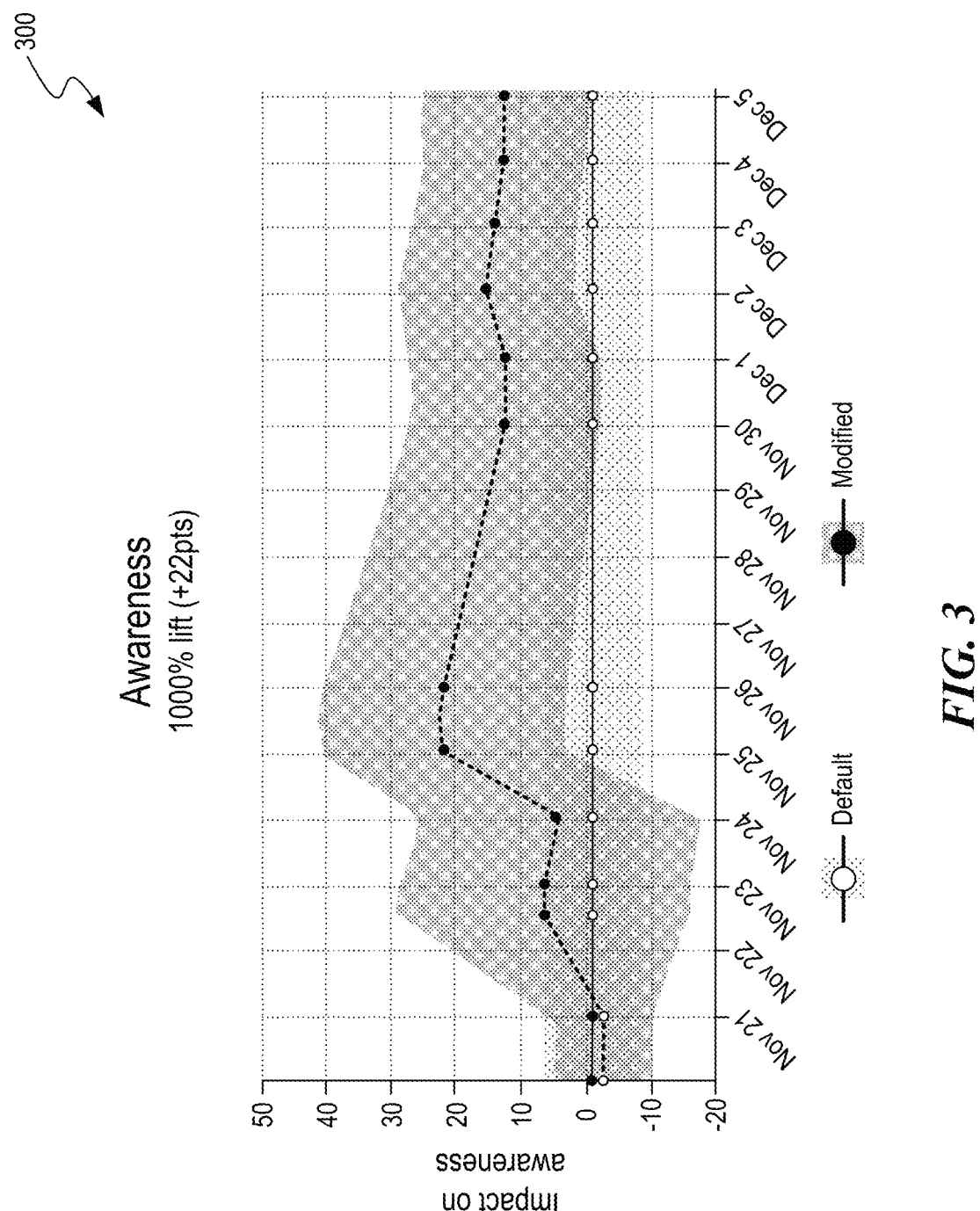
FIG. 3 shows an example graph showing awareness over time resulting from modified transmissions in accordance with some implementations of the present technology.

FIG. 3 shows an example graph 300 showing awareness over time resulting from modified transmissions in accordance with some implementations of the present technology. As shown in FIG. 3, the example graph 300 illustrates awareness of a source of an output over time. The example graph 300 illustrates the difference in awareness resulting from modified transmissions. The x-axis represents the time elapsed, while the y-axis represents the level of awareness. The graph demonstrates that the modified transmissions result in a significantly higher level of awareness over time compared to the default. This suggests that the modifications in the transmission method effectively enhance the awareness of the source of the output. The data points and trend lines in the graph provide a clear visual representation of this difference, highlighting the impact of the present technology on awareness levels. For example, in an advertising campaign context, the modified transmission method might include advertisements or targeted notifications. The graph illustrates that the modified transmissions, which target high-performing segments, resulted in an overall higher awareness of the brand.

In some implementations, the transmission platform can identify, based on the comparing, one or more segments having a statistically significant impact as a result of the transmission. For example, certain segments can demonstrate a difference between the first subset of results and the second subset of results that satisfies a requirement. For example, the requirement can be that the difference between the first subset of results and the second subset of results is statistically significant. Statistical significance is calculated through a series of steps that involve hypothesis testing. The process begins with the formulation of two hypotheses: the null hypothesis (H0), which assumes that there is no effect or difference between the groups being compared, and the alternative hypothesis (H1), which posits that there is a significant effect or difference. Data is then collected from both the control group and the non-control group. The next step involves calculating a test statistic, such as a t-score or z-score, which measures the degree of difference between the groups relative to the variability in the data.

This test statistic is then used to determine the p-value, which indicates the probability of observing the data, or something more extreme, if the null hypothesis is true. The p-value is compared to a predetermined significance level (alpha), commonly set at 0.05. If the p-value is less than the significance level, the null hypothesis is rejected, and the results are considered statistically significant. This means that the observed difference is unlikely to have occurred by chance, and there is sufficient evidence to support the alternative hypothesis. For example, in an A/B test, if the p-value for the difference in conversion rates between the control and non-control groups is 0.03, it is below the 0.05 threshold, indicating that the new feature likely has a real impact on users. When measuring the impact of communications on users, if the p-value for the difference in results between the control and non-control groups is 0.07, it is above the 0.05 threshold, indicating that the output did not impact users.

Returning to FIG. 2, at 212, a decisioning engine identifies top-performing segments. At 214, the transmission platform processes and uploads the identified segments, and at 216, the transmission platform determines how to modify the transmission to target the identified segments. This involves allocating inventory efficiently, with segments showing the greatest positive difference between non-control and control groups receiving the highest priority, as is discussed in greater detail below. The transmission platform then uploads the segments and modifications to an output platform at 218. At 220, the modification can then be sent to an execution platform for execution of the modified transmission.

Additionally, certain insights are output to a reporting platform at 222. For example, the transmission platform can employ advanced visualization tools to generate insightful graphics, analytics, AI-generated segment profiles, and statistical dashboards. These tools provide actionable insights by presenting complex data in an easily understandable format. For example, the transmission platform can create detailed visualizations that highlight key audience segments, their behaviors, and preferences. These visualizations can include spider plots, bar charts, and other visualizations. AI-generated audience profiles and descriptions offer a deeper understanding of the target audience, enabling more precise and personalized marketing strategies. Statistical dashboards can provide real-time analytics, allowing for continuous monitoring and optimization of campaigns. These insights can be visualized using external dashboard tools, providing clear and interpretable data for strategic insights.

In some implementations, the transmission platform can also determine whether the first subset of results is greater in value than the second subset of results. For example, if the first subset of results (e.g., generated by the non-control group) is greater in value than the second subset of results (e.g., generated by the control group) to a statistically significant extent, this can indicate that the transmission had a positive impact on the users. If, in contrast, the first subset of results (e.g., generated by the non-control group) is lesser in value than the second subset of results (e.g., generated by the control group) to a statistically significant extent, that can indicate that the transmission had a negative impact on the users. As an illustrative example, in the communications context, a company can output an advertisement to a subset of its users (e.g., the non-control group) while another subset (e.g., the control group) receives no advertisement. If the first subset of results shows a higher click-through rate compared to the control group, this can indicate that the advertisement had a positive impact on users. The statistical significance of this difference suggests that the advertisement, not random variations, is responsible for this uptick in click-through rate. Conversely, in the software testing realm, a new feature can be introduced to a subset of users (e.g., the non-control group) while the control group continues to use the existing version of the software. If the first subset of results reveals a significantly higher rate of software crashes or user-reported issues compared to the control group, this can indicate that the new feature had a negative impact on the software's stability or user experience. The statistical significance of this difference can highlight the need to address the issues with the new feature, as it is likely that the new feature is responsible for these negative impacts.

Figure 4A:
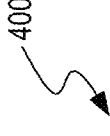
FIG. 4A shows example results associated with the trans-mission platform in accordance with some implementations of the present technology.

FIG. 4A shows example results 400 associated with the transmission platform in accordance with some implementations of the present technology. FIG. 4A illustrates a segmentation by age, in which results (e.g., survey results) from control and non-control groups are compared for each age group. The percent impact represents the percent difference (e.g., improvement or detriment) to the non-control group as a result of the output. The results thereby represent the impact (e.g., harm or benefit) of the output on each age group. In some implementations, certain segments have a positive impact as a result of the output (e.g., 25-34, 35-44, 45-54, and 65+), while certain impacts can be negative (e.g., 18-24 and 55-64). Positive impacts can indicate that a transmission improved one or more metrics with respect to a control group. Negative impacts can indicate that a transmission worsened one or more metrics with respect to a control group. In some implementations, only certain impacts are statistically significant (e.g., 35-44, 45-54, 55-64, and 65+). Other impacts are not statistically significant, indicating that the result is unreliable or that there is insufficient data to support a conclusion about the impact of the output on that particular segment. The transmission platform can use the example results 400 to modify the transmission to target segments showing positive, statistically significant impacts or to refrain from transmitting the output to segments showing negative, statistically significant impacts.

Figure 4B:
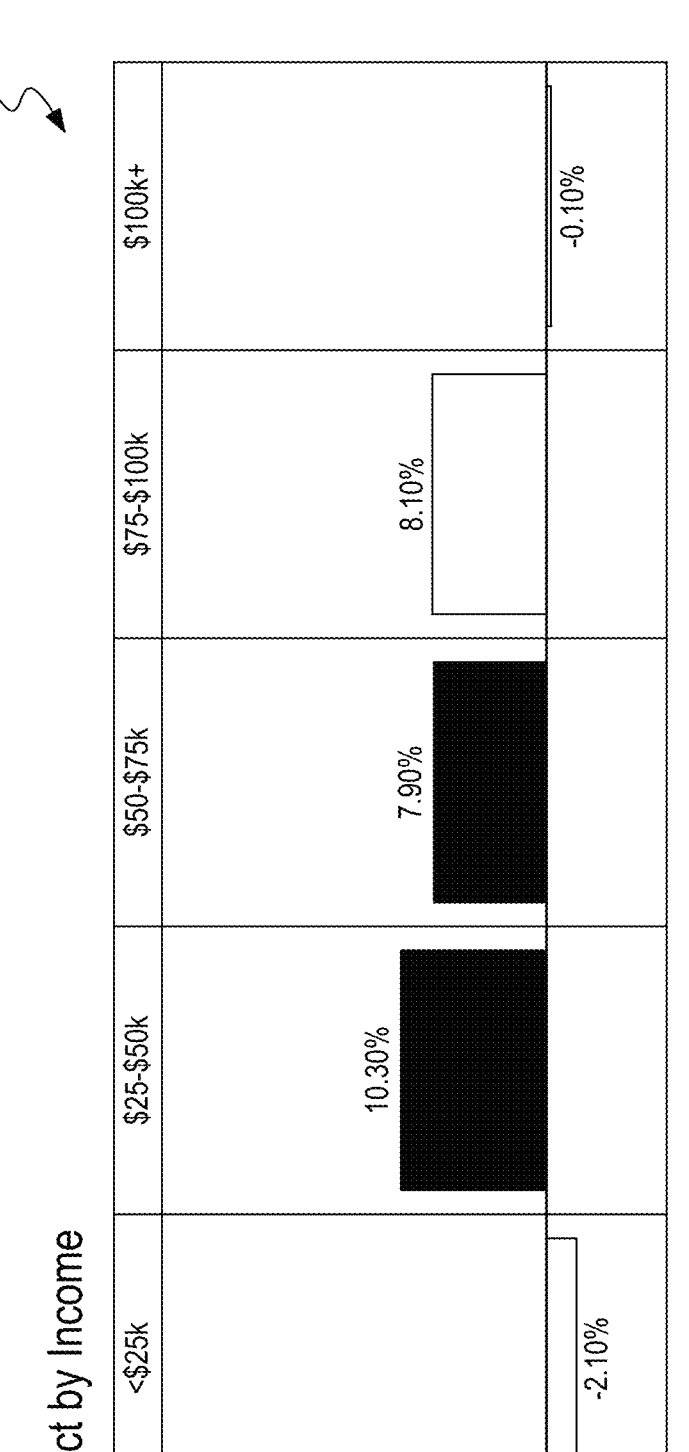
FIG. 4B shows example results associated with the trans-mission platform in accordance with some implementations of the present technology.

FIG. 4B shows example results 410 associated with the transmission platform in accordance with some implementations of the present technology. FIG. 4B illustrates a segmentation by income, in which results (e.g., survey results) from control and non-control groups are compared for each income level. The percent impact represents the percent difference (e.g., improvement or detriment) to the non-control group as a result of the output. The results thereby represent the impact (e.g., harm or benefit) of the output on each income range. In some implementations, certain segments have a positive impact as a result of the output (e.g., $25-50 k, $50-75 k, and $75-100 k), while certain impacts can be negative (e.g., <$25 k and $100 k+). Positive impacts can indicate that a transmission improved one or more metrics with respect to a control group. Negative impacts can indicate that a transmission worsened one or more metrics with respect to a control group. In some implementations, only certain impacts are statistically significant (e.g., $25-50 k and $50-75 k). Other impacts are not statistically significant, indicating that the result is unreliable or that there is insufficient data to support a conclusion about the impact of the output on that particular segment. The transmission platform can use the example results 410 to modify the transmission to target segments showing positive, statistically significant impacts or to refrain from transmitting the output to segments showing negative, statistically significant impacts.

Figure 4C:
FIG. 4C shows example results associated with the trans-mission platform in accordance with some implementations of the present technology.

FIG. 4C shows example results 420 associated with the transmission platform in accordance with some implementations of the present technology. FIG. 4C presents data on the impact of an output on various metrics. For example, FIG. 4C shows a more granular view of how output can impact perception of a source of the output (e.g., awareness, as shown in FIG. 3). In some implementations, the metrics correspond to questions included in a survey disseminated to control and non-control groups. The metrics can include Recall, Message Association, Product Awareness, Product Consideration, and Product Favorability. The data shows the percentage impact for each metric, indicating the change in performance between control and non-control groups. Specifically, for the non-control group as compared to the control group, Recall increased by 0.70%, Message Association decreased by 0.60%, Product Awareness saw a significant rise of 4.60%, Product Consideration improved by 1.20%, and Product Favorability experienced the highest lift at 4.80%. In some implementations, certain impacts can be positive (e.g., Recall, Product Awareness, Product Consideration, and Product Favorability), while certain impacts can be negative (e.g., Message Association). In some implementations, only certain impacts are statistically significant (e.g., Product Awareness and Product Favorability). Other impacts are not statistically significant, indicating that the result is unreliable or that there is insufficient data to support a conclusion about the impact.

In some implementations, the transmission platform determines that there are no segments, based on the initial characteristics, showing a statistically significant impact resulting from the output. As an example, the transmission platform can determine that the segments based on age fail to show any statistically significant results. The transmission platform can then determine updated segments based on additional characteristics and perform the analysis again. For example, the transmission platform can determine, according to the one or more original characteristics and an additional characteristic, updated segments of the first plurality of users and the second plurality of users. Each segment of the updated plurality of segments can include an updated first subset of the first plurality of users (e.g., the non-control group) having the additional characteristic and an updated second subset of the second plurality of users (e.g., the control group) having the additional characteristic.

As an illustrative example, the transmission platform can determine that segmentation based on age alone does not result in statistically significant results. The transmission platform can then update the segmentation to include both age and sex in the segments. For example, the segments can include females aged 18-24, males aged 18-24, females aged 25-24, males aged 25-24, and so on. The transmission platform can perform an updated comparison of the control and non-control groups for each updated segment. In some implementations, the transmission platform determines that there are again no segments for which there is a statistically significant difference between control and non-control groups. Accordingly, the transmission platform can segment the users according to yet another characteristic. In some implementations, the transmission platform can continue this process until the transmission platform determines that there is at least one segment for which there is a statistically significant difference between control and non-control groups.

Multi-dimensional segmentation can enable granular analysis by revealing impacts by various attributes such as age, gender, device, location, and media consumption patterns, as well as permutations of each. This segmentation technique allows the transmission platform to gain deeper insights into the users. By examining multiple dimensions simultaneously, the transmission platform can identify highly detailed segments that are performing well. For example, a transmission can be modified to target young adults aged 18-24 who primarily use mobile devices, live in urban areas, and frequently consume video content. This level of detail ensures that transmission efforts are more precise and effective, leading to better engagement and higher conversion rates.

In some implementations, the transmission platform determines an ordered arrangement of the one or more segments according to a magnitude of the difference between the first subset of results and the second subset of results. For example, the transmission platform determines that the segment of users aged 18-24 shows the largest positive difference in engagement metrics between the non-control group and the control group, followed by the segment of users aged 25-34, and so on. This ordered arrangement can help prioritize which user segments are most positively impacted by the transmission. The transmission platform can use this ordered arrangement to prioritize which user segments to target with future transmissions. For example, the transmission platform can target the segment of users aged 18-24, followed by the segment of users aged 25-34, and so on.

In some implementations, the transmission platform determines a different ordered arrangement of certain different segments according to the magnitude of the difference between the first subset of results and the second subset of results. For example, the magnitude can be negative, indicating a negative impact of the transmissions. The different ordered arrangement can include the segment having the greatest difference between control and non-control groups, with the subset of the non-control group generating results that are lesser in value than the subset of the control group. In some implementations, the different ordered arrangement can rank the segments by negative magnitude, with the segment demonstrating the greatest negative impact at the top, followed by the segment demonstrating the second greatest negative impact, and so on. The transmission platform can use this different ordered arrangement to modify the transmission and refrain from transmitting the outputs to users corresponding to the different segments ranked in the ordered arrangement. For example, based on the results indicating that the transmission is having a negative impact on certain segments, the transmission platform can avoid transmitting the output (e.g., communication, feature, or other output) to those segments in the future.

In some implementations, the transmission platform determines an updated ordered arrangement based on updated segments that have been identified according to additional characteristics, as discussed above. For example, the transmission platform can proceed by determining an updated ordered arrangement of the one or more updated segments according to the magnitude of the difference between the updated first subset of results and the updated second subset of results. This updated ordered arrangement allows the platform to identify which segments show the most significant impact based on the original and additional characteristics. Once the updated ordered arrangement is established, the transmission platform can modify the transmission to output the plurality of outputs to a fourth plurality of users corresponding to the one or more updated segments of the plurality of segments.

For example, in the communications context, if the initial analysis based on age segments fails to show statistically significant results, the transmission platform can incorporate additional characteristics such as geographic location or purchasing behavior. The updated segments might reveal that users aged 18-24 in urban areas show a significant positive impact from a new promotional campaign. The platform can then prioritize sending the modified promotional content to a fourth plurality of users within this updated segment, ensuring that the campaign targets the most responsive audience. In the software testing context, if the initial segmentation based on user experience level does not yield significant results, the transmission platform can include additional characteristics such as device type or usage frequency. The updated analysis might indicate that power users on mobile devices experience the most significant improvements with a new feature. The platform can then modify the transmission to roll out the feature to a fourth plurality of users who are power users on mobile devices, optimizing the deployment strategy to enhance user satisfaction and software performance.

In some implementations, the transmission platform can normalize the ordered arrangement, the updated ordered arrangement, or the different ordered arrangement. Normalization involves adjusting the values of the differences between the first subset of results and the second subset of results to account for variations in segment sizes or other factors that could influence the results. This process ensures that the comparisons between segments are fair and meaningful, allowing for a more accurate assessment of the transmission's impact. For example, in the communications context, if the segment of users aged 18-24 is significantly larger than the segment of users aged 35-44, the raw differences in engagement metrics might be misleading. By normalizing the ordered arrangement, the transmission platform can adjust for the size of each segment, providing a clearer picture of which age group truly responds better to the new marketing campaign. In the software testing context, consider a scenario where different user segments have varying levels of interaction with the software. The segment of power users might naturally generate more data points than occasional users, potentially skewing the results. By normalizing the ordered arrangement, the transmission platform can account for these differences in usage patterns, ensuring that the comparison of error rates or other metrics between segments is accurate and reflects the true impact of the new feature across all user groups.

In some implementations, the ordered arrangement (e.g., ranked according to positive impact) or the different ordered arrangement (e.g., ranked according to negative impact) is weighted according to the number of users belonging to each segment across the first plurality of users and the second plurality of users. For example, the number of users in a segment can indicate a stability or reliability of the results. A segment including 10,000 users that shows a positive impact is more likely to be stable and reliable than a segment including 10 users. Weighting the ordered arrangement according to the number of users in each segment can help ensure that the results are not disproportionately influenced by smaller, potentially less reliable segments. This approach can provide a more balanced and accurate representation of the transmission's impact across different user groups. For example, in the communications context, if a new promotional email shows a positive impact on engagement metrics for a segment of 10,000 users aged 18-24 and a smaller segment of 50 users aged 55-64, the larger segment's results can be given more weight. This weighting reflects the greater stability and reliability of the larger segment's data, ensuring that the overall assessment of the email's effectiveness is not unduly influenced by the smaller, less stable segment. In the software testing context, if a new feature is introduced to various user segments, the segment of power users (e.g., 10,000 users) showing a significant decrease in error rates can be given more weight compared to a smaller segment of occasional users (e.g., 100 users) showing a slight increase. This weighting ensures that the overall evaluation of the new feature's impact is based on more reliable data, providing a clearer understanding of its effectiveness across the broader user base.

The transmission platform can modify the transmission, based on the ordered arrangement or the different ordered arrangement, to transmit the outputs to a third plurality of users corresponding to the one or more segments of the plurality of segments. For example, the transmission platform can prioritize sending the modified transmission to user segments that showed the most positive impact in the ordered arrangement. This targeted approach can maximize the effectiveness of the transmission by focusing on the segments that are most likely to respond favorably. As an illustrative example, in the communications context, if the ordered arrangement indicates that users aged 18-24 and 25-34 had the highest engagement rates after being exposed to an advertisement as compared to users aged 18-24 and 25-34 who were not exposed to the advertisement, the transmission platform can modify the transmission based on feedback from these segments and then send the advertisement to other users within these age groups. This strategy can enhance overall engagement and conversion rates by leveraging insights from the most responsive segments. In the software testing context, if the ordered arrangement reveals that power users experienced the most significant improvements in performance with a new feature, the transmission platform can push the feature out to a third plurality of users who are also power users, ensuring that the most impactful improvements are delivered to those who will benefit the most. This targeted deployment can help in achieving higher user satisfaction and better overall software performance.

In some implementations, modifying the transmission based on the ordered arrangement can affect how the transmission platform prioritizes the segments targeted with the output. For example, this process includes outputting a first portion of the plurality of outputs to a first segment of the third plurality of users corresponding to the highest level of the ordered arrangement. The first amount of the first portion of the outputs is determined based on at least one of the output availability or the first segment availability. For example, there can be a limited number of outputs to transmit and a limited number of users in each segment. Once the first segment has received its portion, the transmission platform can then output a second portion of the outputs to a second segment of the third plurality of users corresponding to the second highest level of the ordered arrangement. The second amount of the second portion is similarly determined based on the output availability or the second segment availability. This process continues until no portions of the outputs remain, at which point the transmission ceases.

For example, in the communications context, if a company is outputting a limited number of a certain advertisement (e.g., based on budget), the transmission platform can first allocate a number of advertisements to the segment of users aged 18-24, who have shown the highest engagement rates. The number of advertisements allocated to this segment is based on the availability of the advertisement (e.g., subject to budget) and the size of the segment. In some implementations, the transmission platform can exhaust a budget associated with the advertisement by targeting just the highest segment in the ordered arrangement. In some implementations, after outputting the advertisement to the highest segment, the platform has a leftover budget and can then output the advertisement to the next highest segment, such as users aged 25-34, and so on. In the software testing context, if a new feature is being rolled out to users, the transmission platform can first release the feature to power users who have shown the most significant improvements in performance. The number of users receiving the feature is determined by the availability of the feature and the size of the power user segment. Once the power users have received the feature, the platform can then release it to the next segment, such as moderate users, and so on until the feature has been fully deployed. This tiered approach ensures that the most impactful segments receive the outputs first, maximizing the overall effectiveness of the transmission.

Applying a regulatory constraint to the plurality of outputs for the modified transmission can be an important step in ensuring compliance with legal and ethical standards. The transmission platform can apply a regulatory constraint to the plurality of outputs based on the plurality of users to whom the transmission is directed (e.g., the third plurality of users). The transmission platform can further modify the transmission to output the plurality of outputs to a subset of the third plurality of users. For example, the subset of the third plurality of users can exclude any users of the third plurality of users violating the regulatory constraint. For example, in an advertising campaign, this process can involve identifying and excluding users who do not meet specific regulatory criteria or constraints. An example of this can be seen in the advertising of alcohol, where it is important to exclude users under the age of 21 from receiving such advertisements. The transmission can be modified to ensure that the plurality of outputs is only directed to a compliant subset of the third plurality of users. Similarly, in the context of software, regulatory constraints can be applied to ensure that new features are only transmitted to users who have the necessary authorization. For example, a software company can develop a new feature that is only available to premium subscribers. The transmission platform can be programmed to identify and exclude users who do not have the appropriate subscription level, thereby ensuring that only authorized users receive access to the new feature. This can be achieved by integrating user authentication and subscription verification processes within the software, which can dynamically filter and modify the transmission of updates based on user authorization status.

The implementations discussed herein can apply to different ecosystems, such as private marketplace (PMP) contracts and demand-side platforms (DSPs). PMP contracts can relate to closed, invitation-only marketplaces in which premium publishers offer their inventory to a select group of advertisers, ensuring higher quality and more controlled placements. DSPs can be open systems that allow organizations to purchase digital media across various websites through real-time bidding (RTB), offering extensive third-party data integration and flexibility. Varied approaches can thus be used for PMP contracts and DSPs due to the differences in how these systems operate and the data they provide. However, any of the implementations discussed herein are applicable to various different types of systems, including both PMP contracts and DSPs.

In some implementations, the transmission platform leverages identifier (ID) graph expansion to improve reach and scale of transmission by connecting disparate device and user identifiers across platforms. For example, the transmission platform can seamlessly map and process large-scale user data, ensuring a comprehensive and unified view of target segments. The transmission platform can link various identifiers, such as cookies, mobile device IDs, and other user identifiers, across different platforms and devices. As a result, the transmission platform can achieve a more accurate and extensive reach, targeting users more effectively regardless of the device or platform they are using. For example, the transmission platform can identify and connect a user's interactions on their smartphone, tablet, and desktop to enable consistent and personalized delivery of outputs across all devices. This capability is important for optimizing output strategies and maximizing the impact of transmissions, ultimately leading to better engagement and higher conversion rates.

Example Methods of Operation of the Transmission Platform

Figure 5:
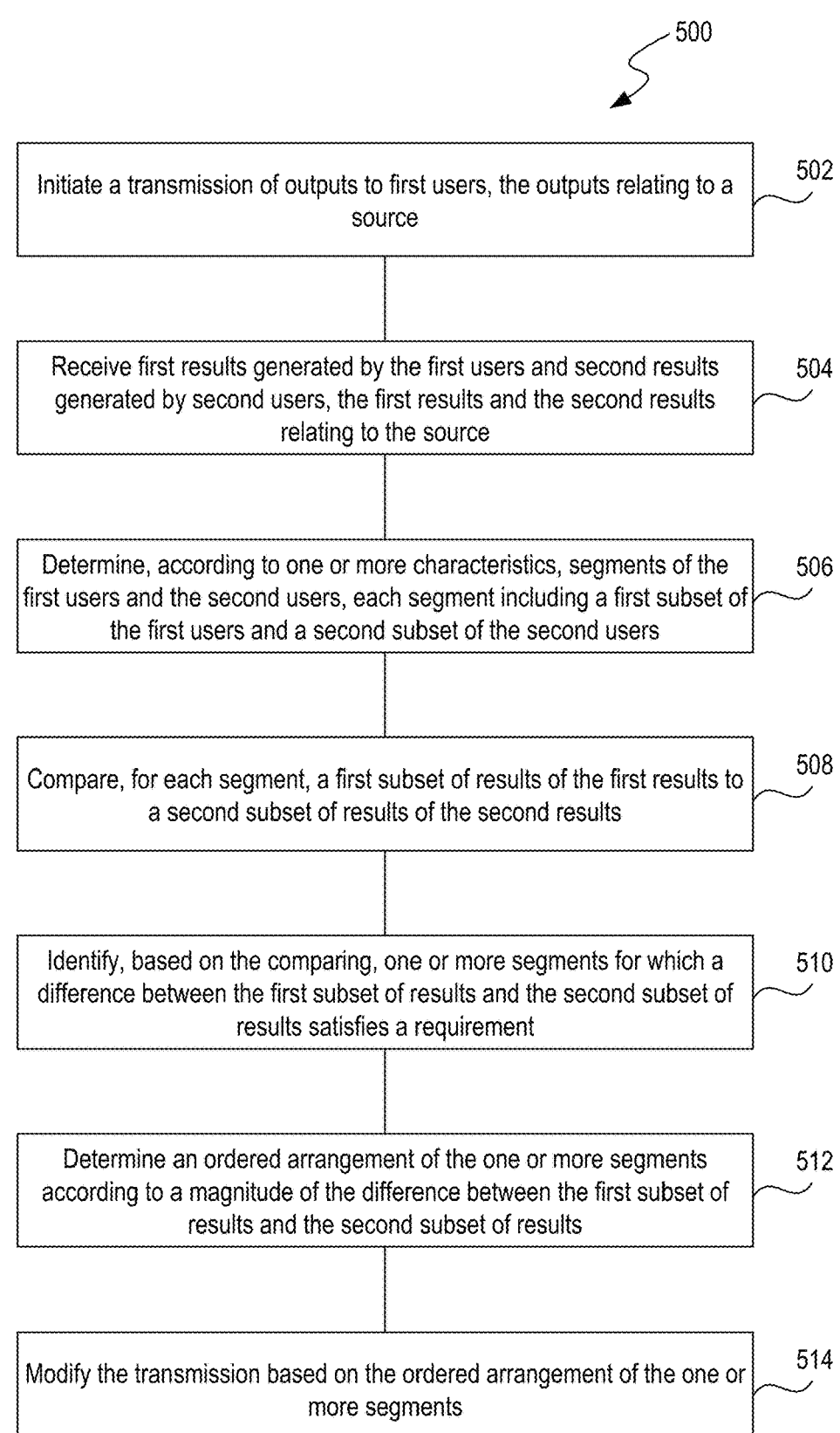
FIG. 5 is a flowchart depicting an example method of operation of the transmission platform of FIG. 1 in accor-dance with some implementations of the present technology.

FIG. 5 is a flowchart depicting an example method 500 of operation of the transmission platform 102 of FIG. 1, in accordance with some implementations of the present technology. In some implementations, the method 500 is performed by components of the example computer system 600 illustrated and described in more detail with reference to FIG. 6. Likewise, implementations can include different and/or additional operations or can perform the operations in different orders.

In operation 502, the transmission platform 102 initiates a transmission of outputs to first users. For example, the outputs can include communications, software features or updates, or other outputs. For example, in the communications context, the transmission platform can send advertisements to a first group of users. These advertisements can include personalized offers, product recommendations, or updates about new arrivals. In the software context, the transmission platform can initiate the rollout of a new software feature to a first group of users. This feature can be an update to an existing application, such as a new user interface design or an added functionality. The outputs can relate to a source of the outputs. For example, the output can refer or relate to the company, users, group, or other source from which the output originated. As an illustrative example, the source can be a company being advertised or a company operating certain software.

In operation 504, the transmission platform 102 receives first results generated by the first users and second results generated by second users, the first results and the second results relating to the source. For example, in the context of advertisements, the first results can include click-through rates, conversion rates, and user engagement metrics from users who received the advertisements. The second results can include similar metrics from a control group of users who did not receive the advertisements. These results help in assessing the effectiveness of the advertising campaign. In the software context, the first results can include feedback, bug reports, and usage statistics from the group of beta testers who received the new software feature. The second results can include similar data from a control group using the previous version of the software. This comparison helps in evaluating the impact and performance of the new feature.

In operation 506, the transmission platform 102 determines, according to one or more characteristics, segments of the first users and the second users, each segment including a first subset of the first users and a second subset of the second users. For example, in the context of advertisements, the transmission platform can segment users based on demographic characteristics such as age, gender, and location. The first subset of users who received the advertisements and the second subset of users who did not can both be grouped into segments like "males aged 18-24 in urban areas" and "females aged 25-34 in suburban areas." This segmentation allows for a more detailed analysis of the advertisement's effectiveness across different user groups. In the software context, the platform can segment users based on their usage patterns and technical characteristics. For example, the first subset of beta testers and the second subset of control users can both be segmented into groups like "heavy users of the application" and "users with older devices." This helps in understanding how different user segments respond to the new software feature.

In operation 508, the transmission platform 102 compares, for each segment, a first subset of results of the first results to a second subset of results of the second results. For example, in the context of advertisements, the transmission platform can compare the click-through rates and conversion rates of the first subset of users who received the advertisements to the second subset of users who did not within each segment. For example, the platform can compare the results for "males aged 18-24 in urban areas" who received the advertisements to those who did not to determine the advertisement's effectiveness in that specific demographic. In the software context, the platform can compare feedback and usage statistics from the first subset of beta testers to the second subset of control users within each segment. For example, the platform can compare the results for "heavy users of the application" who tested the new feature to those who did not to evaluate the feature's impact on this particular user group.

In operation 510, the transmission platform 102 identifies, based on the comparing, one or more segments for which a difference between the first subset of results and the second subset of results satisfies a requirement. In some implementations, the requirement can include the statistical significance between control and non-control results for a particular segment. For example, in the context of advertisements, the transmission platform can identify segments where the difference in click-through rates and conversion rates between users who received the advertisements and those who did not is statistically significant. For example, the platform can find that "females aged 25-34 in suburban areas" show a statistically significant increase in conversion rates when exposed to the advertisements, indicating that this segment responds particularly well to the campaign. In the software context, the platform can identify segments where the difference in feedback and usage statistics between beta testers and control users is statistically significant. For example, the platform can determine that "heavy users of the application" who tested the new feature report significantly higher satisfaction and engagement levels compared to those who did not, with the difference being statistically significant. This suggests that the feature is particularly beneficial for this user group.

In operation 512, the transmission platform 102 determines an ordered arrangement of the one or more segments according to a magnitude of the difference between the first subset of results and the second subset of results. For example, in the context of advertisements, the transmission platform can rank the segments based on the magnitude of the difference in click-through rates and conversion rates between users who received the advertisements and those who did not. Segments with the largest statistically significant differences, such as "females aged 25-34 in suburban areas," can be placed at the top of the list, indicating that these segments respond most positively to the advertisements. In the software context, the platform can order the segments based on the magnitude of the difference in feedback and usage statistics between beta testers and control users. Segments with the most substantial statistically significant improvements, such as "heavy users of the application," can be prioritized, suggesting that these users benefit the most from the new feature.

In operation 514, the transmission platform 102 modifies the transmission based on the ordered arrangement of the one or more segments. For example, in the context of a marketing campaign, if the ordered arrangement indicates that users aged 18-24 in urban areas show the highest engagement rates, the transmission platform can modify the campaign to prioritize this segment. This might involve targeting this segment with the advertisement. In particular, the transmission platform can target users in this segment who have not yet been exposed to the advertisement. By focusing on the highest-impact segment first, the campaign can achieve better overall results. In the software deployment context, if the ordered arrangement reveals that power users on mobile devices experience the most significant improvements with a new feature, the transmission platform can modify the rollout strategy to prioritize these users. This could involve releasing the feature to this segment first before expanding the rollout to other segments. This approach ensures that the most responsive users receive the feature.

Example Computing Environment of the Transmission Platform

Figure 6:
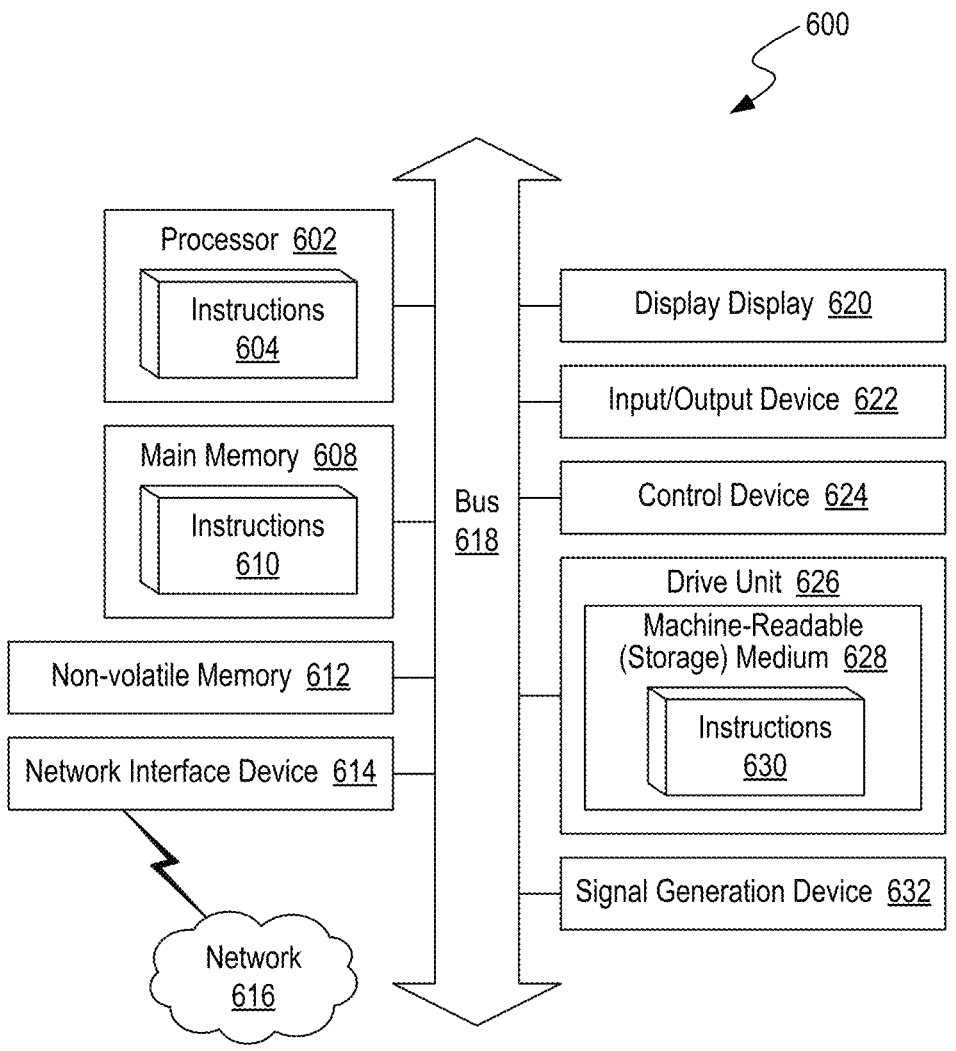
FIG. 6 is a block diagram showing some of the compo-nents typically incorporated in at least some of the computer systems and other devices on which the transmission plat-form operates in accordance with some implementations of the present technology.

FIG. 6 is a block diagram showing some of the components typically incorporated in at least some of the computer system 600 on which the disclosed system operates in accordance with some implementations of the present technology. As shown, an example computer system 600 can include one or more processors 602, main memory 608, non-volatile memory 612, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 shares a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 610, 630) set at various times in various memory and storage devices in computing device(s). When read and executed by the processor 602, the instruction(s) cause the computer system 600 to perform operations to execute elements involving the various aspects of the disclosure.

Figure 7:
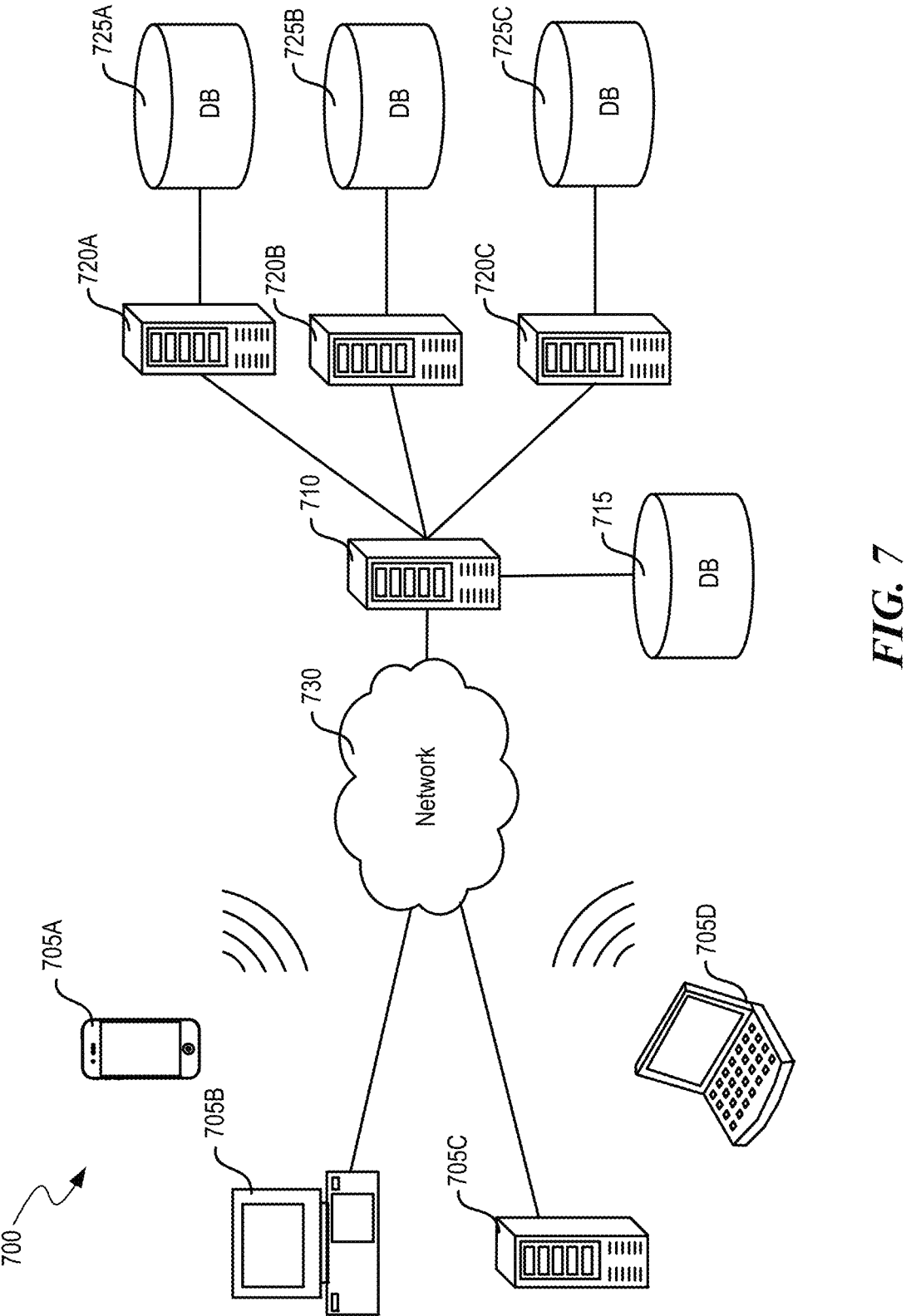
FIG. 7 is a system diagram illustrating an example of a computing environment in which the transmission platform operates in some implementations of the present technology.

FIG. 7 is a system diagram illustrating an example of a computing environment in which the disclosed system operates in some implementations. In some implementations, environment 700 includes one or more client computing devices 705A-D, examples of which can host the transmission platform 102 of FIG. 1. Client computing devices 705 operate in a networked environment using logical connections through network 730 to one or more remote computers, such as a server computing device.

In some implementations, server 710 is an edge server that receives client requests and coordinates fulfillment of those requests through other servers, such as servers 720A-C. In some implementations, server computing devices 710 and 720 comprise computing systems, such as the transmission platform 102 of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as claims data, email data, call transcripts, call logs, policy data and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but it can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology include not only additional elements to those implementations noted above but also can include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms in either this application or in a continuing application.

We claim:

1. A computer-implemented method for modifying transmissions, by a transmission platform, based on sectionalization of transmission results, the computer-implemented method comprising:

initiating a transmission of a plurality of outputs to a first plurality of users, the plurality of outputs relating to a source;

receiving a first plurality of results generated by the first plurality of users and a second plurality of results generated by a second plurality of users, the first plurality of results and the second plurality of results relating to the source;

determining, according to one or more characteristics, a plurality of segments of the first plurality of users and the second plurality of users, each segment of the plurality of segments comprising a first subset of the first plurality of users and a second subset of the second plurality of users;

comparing, for each segment of the plurality of segments, a first subset of results of the first plurality of results to a second subset of results of the second plurality of results, wherein the first subset of results is generated by a corresponding first subset of the first plurality of users and the second subset of results is generated by a corresponding second subset of the second plurality of users;

identifying, based on the comparing, one or more segments of the plurality of segments for which (i) a difference between the first subset of results and the second subset of results satisfies a requirement and (ii) the first subset of results is greater in value than the second subset of results;

determining an ordered arrangement of the one or more segments according to a magnitude of the difference between the first subset of results and the second subset of results; and modifying the transmission, based on the ordered arrangement of the one or more segments, to output the plurality of outputs to a third plurality of users corresponding to the one or more segments of the plurality of segments.

2. The computer-implemented method of claim 1, further comprising:

determining, according to the one or more characteristics and an additional characteristic, an updated plurality of segments of the first plurality of users and the second plurality of users, each segment of the updated plurality of segments comprising an updated first subset of the first plurality of users and an updated second subset of the second plurality of users;

comparing, for each updated segment of the updated plurality of segments, an updated first subset of results of the first plurality of results to an updated second subset of results of the second plurality of results, wherein the updated first subset of results is generated by an updated corresponding first subset of the first plurality of users and the updated second subset of results is generated by an updated corresponding second subset of the second plurality of users;

identifying one or more updated segments of the plurality of segments for which (i) an updated difference between the updated first subset of results and the updated second subset of results satisfies the requirement and (ii) the updated first subset of results is greater in value than the updated second subset of results;

determining an updated ordered arrangement of the one or more updated segments according to the magnitude of the difference between the updated first subset of results and the updated second subset of results; and modifying the transmission, based on the updated ordered arrangement of the one or more updated segments, to output the plurality of outputs to a fourth plurality of users corresponding to the one or more updated segments of the plurality of segments.

3. The computer-implemented method of claim 1, further comprising:

identifying, based on the comparing, one or more different segments of the plurality of segments for which (i) the difference between the first subset of results and the second subset of results satisfies a requirement and (ii) the first subset of results is lower in value than the second subset of results;

determining a different ordered arrangement of the one or more different segments according to the magnitude of the difference between the first subset of results and the second subset of results; and modifying the transmission, based on the different ordered arrangement of the one or more segments, to refrain from transmitting the plurality of outputs to a different plurality of users corresponding to the one or more different segments of the plurality of segments.

4. The computer-implemented method of claim 1, wherein modifying the transmission, based on the ordered arrangement of the one or more segments, to output the plurality of outputs to the third plurality of users comprises:

outputting a first portion of the plurality of outputs to a first segment of the third plurality of users corresponding to a highest level of the ordered arrangement, wherein a first amount of the first portion of the plurality of outputs is determined based on at least one of an output availability of the plurality of outputs or a first segment availability of the first segment;

based on a portion of the plurality of outputs remaining after output to the first segment, outputting a second portion of the plurality of outputs to a second segment of the third plurality of users corresponding to a second highest level of the ordered arrangement, wherein a second amount of the second portion of the plurality of outputs is determined based on at least one of the output availability of the plurality of outputs or a second segment availability of the second segment; and based on determining that no portions of the plurality of outputs remain, cease the transmission.

5. The computer-implemented method of claim 1, wherein the ordered arrangement of the one or more segments is weighted according to a number of users belonging to each segment of the one or more segments across the first plurality of users and the second plurality of users.

6. The computer-implemented method of claim 1, further comprising:

applying a regulatory constraint to the plurality of outputs based on the third plurality of users; and further modifying the transmission to output the plurality of outputs to a subset of the third plurality of users, wherein the subset of the third plurality of users excludes any users of the third plurality of users violating the regulatory constraint.

7. One or more non-transitory, computer-readable storage media storing instructions for modifying transmissions, by a transmission platform, based on sectionalization of transmission results, wherein the instructions when executed by at least one data processor of a computing system, cause the computing system to:

initiate a transmission of a plurality of outputs to a first plurality of users, the plurality of outputs relating to a source;

receive a first plurality of results generated by the first plurality of users and a second plurality of results generated by a second plurality of users, the first plurality of results and the second plurality of results relating to the source;

determine, according to one or more characteristics, a plurality of segments of the first plurality of users and the second plurality of users, each segment of the plurality of segments comprising a first subset of the first plurality of users and a second subset of the second plurality of users;

compare, for each segment of the plurality of segments, a first subset of results of the first plurality of results to a second subset of results of the second plurality of results, wherein the first subset of results is generated by a corresponding first subset of the first plurality of users and the second subset of results is generated by a corresponding second subset of the second plurality of users;

identify, based on the comparing, one or more segments of the plurality of segments for which a difference between the first subset of results and the second subset of results satisfies a requirement;

determine an ordered arrangement of the one or more segments according to a magnitude of the difference between the first subset of results and the second subset of results; and modify the transmission based on the ordered arrangement of the one or more segments.

8. The one or more non-transitory, computer-readable storage media of claim 7, wherein the first subset of results is lower in value than the second subset of results, and wherein the instructions causing the computing system to modify the transmission further cause the computing system to refrain from transmitting the plurality of outputs to a third plurality of users corresponding to the one or more segments of the plurality of segments.

9. The one or more non-transitory, computer-readable storage media of claim 7, wherein the first subset of results is greater in value than the second subset of results, and wherein the instructions causing the computing system to modify the transmission further cause the computing system to output the plurality of outputs to a third plurality of users corresponding to the one or more segments.

10. The one or more non-transitory, computer-readable storage media of claim 9, wherein the instructions causing the computing system to output the plurality of outputs to the third plurality of users further cause the computing system to:

output a first portion of the plurality of outputs to a first segment of the third plurality of users corresponding to a highest level of the ordered arrangement, wherein a first amount of the first portion of the plurality of outputs is determined based on at least one of an output availability of the plurality of outputs or a first segment availability of the first segment;

based on a portion of the plurality of outputs remaining after output to the first segment, output a second portion of the plurality of outputs to a second segment of the third plurality of users corresponding to a second highest level of the ordered arrangement, wherein a second amount of the second portion of the plurality of outputs is determined based on at least one of the output availability of the plurality of outputs or a second segment availability of the second segment; and based on determining that no portions of the plurality of outputs remain, cease the transmission.

11. The one or more non-transitory, computer-readable storage media of claim 7, wherein the instructions further cause the computing system to:

determine, according to the one or more characteristics and an additional characteristic, an updated plurality of segments of the first plurality of users and the second plurality of users, each segment of the updated plurality of segments comprising an updated first subset of the first plurality of users and an updated second subset of the second plurality of users;

compare, for each updated segment of the updated plurality of segments, an updated first subset of results of the first plurality of results to an updated second subset of results of the second plurality of results, wherein the updated first subset of results is generated by an updated corresponding first subset of the first plurality of users and the updated second subset of results is generated by an updated corresponding second subset of the second plurality of users;

identify one or more updated segments of the plurality of segments for which (i) an updated difference between the updated first subset of results and the updated second subset of results satisfies the requirement and (ii) the updated first subset of results is greater in value than the updated second subset of results;

determine an updated ordered arrangement of the one or more updated segments according to the magnitude of the difference between the updated first subset of results and the updated second subset of results; and modify the transmission, based on the updated ordered arrangement of the one or more updated segments, to output the plurality of outputs to a fourth plurality of users corresponding to the one or more updated segments of the plurality of segments.

12. The one or more non-transitory, computer-readable storage media of claim 7, wherein the ordered arrangement of the one or more segments is weighted according to a number of users belonging to each segment of the one or more segments across the first plurality of users and the second plurality of users.

13. The one or more non-transitory, computer-readable storage media of claim 7, wherein the instructions further cause the computing system to:

apply a regulatory constraint to the plurality of outputs; and further modify the transmission to exclude any users violating the regulatory constraint.

14. A system for modifying transmissions by a transmission platform, the system comprising:

at least one hardware processor; and at least one non-transitory memory storing instructions, which, when executed by the at least one hardware processor, cause the system to:

initiate a transmission of a plurality of outputs to a first plurality of users, the plurality of outputs relating to a source;

receive a first plurality of results generated by the first plurality of users and a second plurality of results generated by a second plurality of users, the first plurality of results and the second plurality of results relating to the source;

determine, according to one or more characteristics, a plurality of segments of the first plurality of users and the second plurality of users, each segment of the plurality of segments comprising a first subset of the first plurality of users and a second subset of the second plurality of users;

compare, for each segment of the plurality of segments, a first subset of results of the first plurality of results to a second subset of results of the second plurality of results, wherein the first subset of results is generated by a corresponding first subset of the first plurality of users and the second subset of results is generated by a corresponding second subset of the second plurality of users;

identify, based on the comparing, one or more segments of the plurality of segments for which a difference between the first subset of results and the second subset of results satisfies a requirement;

determine an ordered arrangement of the one or more segments according to a magnitude of the difference between the first subset of results and the second subset of results; and modify the transmission based on the ordered arrangement of the one or more segments.

15. The system of claim 14, wherein the first subset of results is lower in value than the second subset of results, and wherein the instructions causing the system to modify the transmission further cause the system to refrain from transmitting the plurality of outputs to a third plurality of users corresponding to the one or more segments of the plurality of segments.

16. The system of claim 14, wherein the first subset of results is greater in value than the second subset of results, and wherein the instructions causing the system to modify the transmission further cause the system to output the plurality of outputs to a third plurality of users corresponding to the one or more segments.

17. The system of claim 16, wherein the instructions causing the system to output the plurality of outputs to the third plurality of users further cause the system to:

output a first portion of the plurality of outputs to a first segment of the third plurality of users corresponding to a highest level of the ordered arrangement, wherein a first amount of the first portion of the plurality of outputs is determined based on at least one of an output availability of the plurality of outputs or a first segment availability of the first segment;

based on a portion of the plurality of outputs remaining after output to the first segment, output a second portion of the plurality of outputs to a second segment of the third plurality of users corresponding to a second highest level of the ordered arrangement, wherein a second amount of the second portion of the plurality of outputs is determined based on at least one of the output availability of the plurality of outputs or a second segment availability of the second segment; and based on determining that no portions of the plurality of outputs remain, cease the transmission.

18. The system of claim 14, wherein the instructions further cause the system to:

determine, according to the one or more characteristics and an additional characteristic, an updated plurality of segments of the first plurality of users and the second plurality of users, each segment of the updated plurality of segments comprising an updated first subset of the first plurality of users and an updated second subset of the second plurality of users;

compare, for each updated segment of the updated plurality of segments, an updated first subset of results of the first plurality of results to an updated second subset of results of the second plurality of results, wherein the updated first subset of results is generated by an updated corresponding first subset of the first plurality of users and the updated second subset of results is generated by an updated corresponding second subset of the second plurality of users;

identify one or more updated segments of the plurality of segments for which (i) an updated difference between the updated first subset of results and the updated second subset of results satisfies the requirement and (ii) the updated first subset of results is greater in value than the updated second subset of results;

determine an updated ordered arrangement of the one or more updated segments according to the magnitude of the difference between the updated first subset of results and the updated second subset of results; and modify the transmission, based on the updated ordered arrangement of the one or more updated segments, to output the plurality of outputs to a fourth plurality of users corresponding to the one or more updated segments of the plurality of segments.

19. The system of claim 14, wherein the ordered arrangement of the one or more segments is weighted according to a number of users belonging to each segment of the one or more segments across the first plurality of users and the second plurality of users.

20. The system of claim 14, wherein the instructions further cause the system to:

apply a regulatory constraint to the plurality of outputs; and further modify the transmission to exclude any users violating the regulatory constraint.

* * * * *